March 25, 1952        J. P. BUCKEY        2,590,152
VACUUM CLEANER WITH STERILIZING MEANS
Filed Jan. 16, 1945
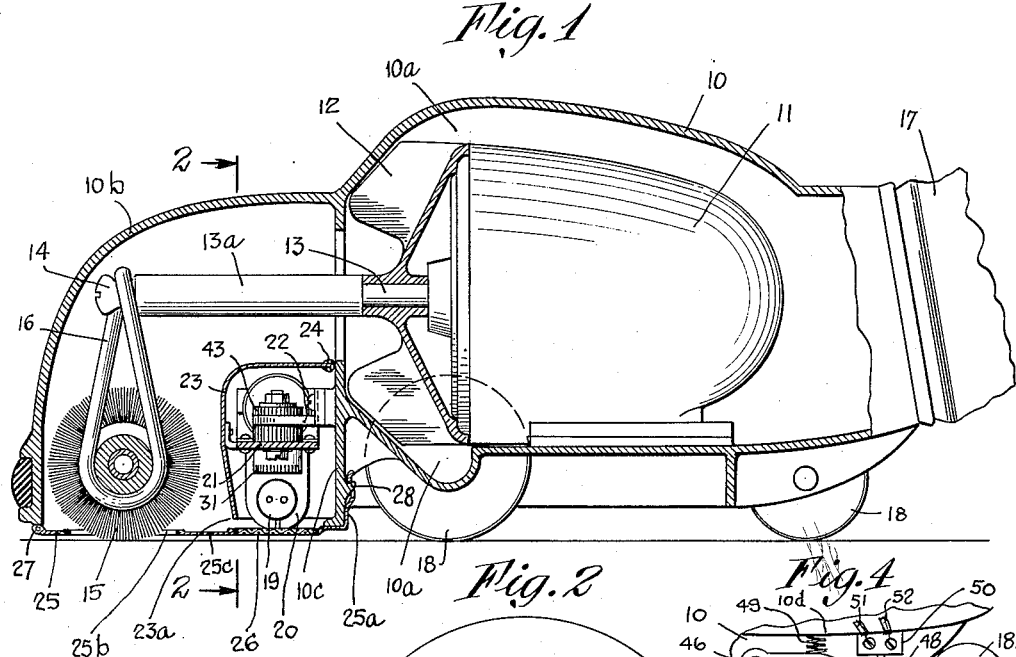
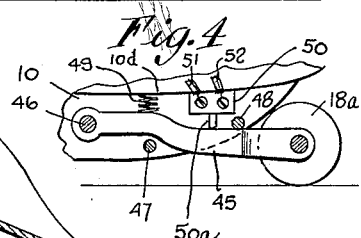
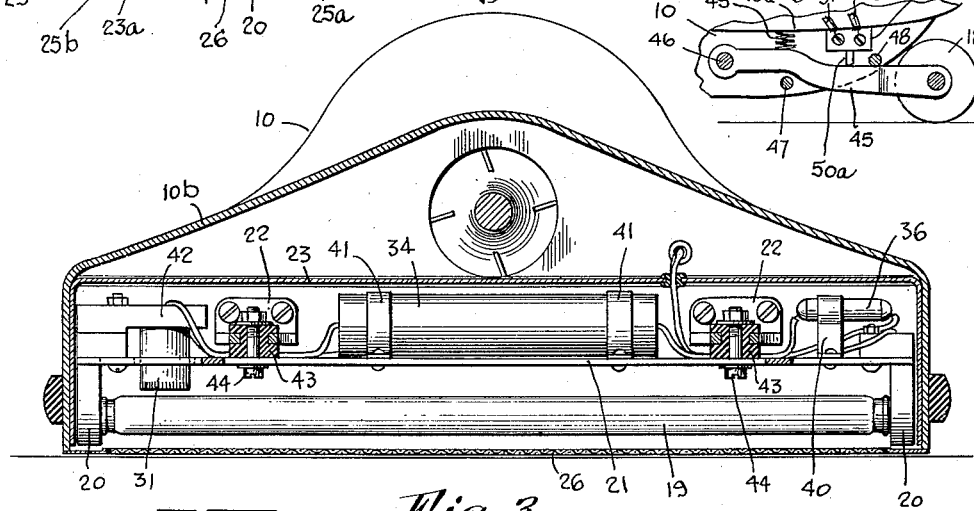
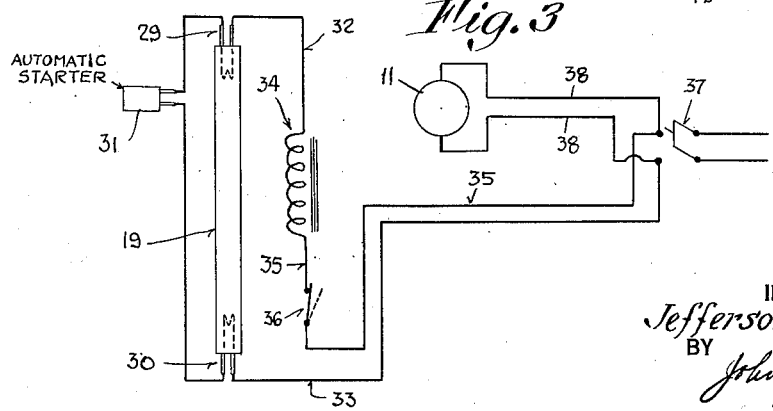
INVENTOR
Jefferson P. Buckey
BY
Johnson + Kline
ATTORNEYS Patented Mar. 25, 1952

2,590,152

UNITED STATES PATENT OFFICE 2,590,152

VACUUM CLEANER WITH STERILIZING MEANS

Jefferson P. Buckey, Easton, Conn.; John F. McGowan, administrator of said Jefferson P. Buckey, deceased, assignor to John T. Kilbride, Stratford, Conn.

Application January 16, 1945, Serial No. 573,133

10 Claims. (Cl. 15—319)

This invention relates to electric vacuum cleaners, and more particularly to cleaners having sterilizing or germicidal means associated therewith.

Various germicidal devices have been proposed in the past in connection with vacuum cleaners. One such device comprises an ozonizer which is so located as to supply ozone to, and purify, the air passing from the filter of the cleaner out into the room. In another device, the air and dust within the filter is purified by a sterilizing device in the form of an electric bulb adapted to emit ultraviolet rays, the bulb being mounted inside the filter bag. These devices have a number of disadvantages. For instance, by the use of the ozonizer whereby the air being discharged into the room is ozonized and purified, an objectionably large amount of ozone may ultimately exist in the room, causing discomfort and in extreme cases injury to health. In the case of the ultraviolet-ray bulb located within the filter bag of the cleaner, the danger of the room becoming ozonized is not so great, but the arrangement is inconvenient when the filter is to be removed for cleaning, since the bulb is in the way, and there is required a somewhat complicated structure to properly support the bulb and prevent breakage thereof. Also, the likelihood exists of the bulb becoming coated with dust particles, which prevent its effectiveness since the rays are shielded thereby and prevented from acting on the air and contents of the filter.

These prior devices, moreover, have little if any effect on the surface which is being cleaned, since they are mainly concerned with purifying the contents of the filter or the air being discharged from the filter.

An object of the present invention is to provide a vacuum cleaner having sterilizing or germinactivating means which overcome the disadvantages of these prior devices and has great beneficial effects, since it acts not only on the air and dust but also on the material being cleaned.

This is accomplished by the provision of a vacuum cleaner having a ray-emitting and ozone-producing device which is located in the floor-traversing nozzle of the cleaner in such a manner that the rug or floor covering being cleaned is directly exposed to the rays, as is also the air and dust particles being sucked into the cleaner. The rays, which may be in or include the ultraviolet portion of the spectrum, function to inactivate and destroy germs on the floor surface and in the air sucked in. Added to the air, also, is a slight amount of ozone, which further sterilizes and purifies it, the amount produced being small however, so that even if the cleaner should be operated for an extended period, the ozone reaching the atmosphere of the room would not be excessive.

According to this invention, the ozone is fed into the filter, chemically reacting with the contents thereof and the air blown in to such an extent that it is reduced. Therefore, it performs its work of sterilizing within the filter bag, and is not sent out into the room in objectionable quantities.

In the embodiment of the invention illustrated herein as exemplary thereof the sterilizing and purifying device comprises an elongate gaseous discharge tube mounted to extend along the nozzle of the cleaner in close proximity to the floor surface with a perforated shield or guard between the tube and the floor surface to prevent damage from objects which may be run over by the cleaner. In front of the tube is located the conventional rotary brush, and a baffle arrangement is provided in the nozzle so that dirt particles and dust laden air are caused to pass under the ray-emitting tube and be purified as they are sucked into the nozzle.

A further feature of the invention is the provision of an automatic electric switch for controlling the circuit of the tube whereby when the sweeper is lifted from the floor the tube will be de-energized automatically, thereby preventing possible danger to a user from the ultraviolet rays.

Another feature is the arrangement whereby the discharge tube is easily accessible, and may be conveniently replaced should this be necessary.

Other features and advantages will hereinafter appear.

In the accompanying drawings:

Figure 1 is a vertical central section, partly in elevation, of a vacuum cleaner illustrating an embodiment of the invention.

Fig. 2 is a section taken on the line 2—2 of Fig. 1.

Fig. 3 is a diagram showing the electric circuit of the vacuum cleaner, and

Fig. 4 is a fragmentary elevation of an automatically operative switch means made according to a modification of the invention.

Referring to Figs. 1 and 2 the cleaner illustrated as embodying the invention comprises a housing 10 in which is mounted an electric motor 11 carrying an air impeller 12 on its shaft 13, the latter having a forwardly extending portion 13a terminating in a pulley 14 which drives a rotary brush 15 of the usual type by means of a belt 16. The housing is shaped to provide air passages 10a at the periphery of the impeller 12, these passages extending rearwardly past the motor 11 and communicating with a filter bag 17.

Wheels 18 are rotatably mounted on the housing 10 in the usual manner to enable it to be moved back and forth over a floor surface so that the latter is engaged by the rotary brush 15. The housing has a forward extension 10b enclosing the portion 13a of the shaft and also the rotary brush 15 which it carries and has an elongate bottom opening, the edges of which extend closely adjacent the floor surface, the extension 10b functioning as the nozzle or collector portion of the cleaner.

According to the present invention a sterilizing and germ-inactivating means is provided within the nozzle 10b of the housing, which subjects the floor surface being cleaned, and the air and dirt being sucked into the nozzle, to a wave or ray emission to purify the latter and also the contents of the filter bag 17. In the embodiment of the invention illustrated herein this means comprises an elongate gaseous discharge tube of the type adapted to emit ultraviolet rays, and to produce ozone at a limited rate.

As shown in Fig. 1, the shaft 13a and nozzle 10b extend forwardly sufficient to provide a space between the rotary brush 15 and the vertical wall 10c of the housing, and the purifying and germ-inactivating means within this space. The gaseous discharge tube, indicated by the character 19, extends along the full width of the nozzle 10b, and is carried at its ends in suitable sockets 20 mounted on the ends of an elongate base plate 21 secured by brackets 22 to the wall 10c of the housing.

The mounting of the tube 19 is therefore such that it extends in close proximity to the floor surface on which the vacuum cleaner rests, and may provide a concentration of ultraviolet rays striking and sterilizing the latter. It will be noted that the tube 19 is also so located that air sucked into the nozzle past the lower edge of the wall 10c thereof may be swept forwardly under the tube 19 and be purified by the radiation therefrom. In accomplishing this, a partition 23 is provided extending forwardly from the wall 10c and downwardly so that its lower edge 23a is approximately level with the lower surface of the tube 19. The partition 23 preferably forms an air-tight connection with the wall 10c as shown in Fig. 1, this being effected by means of a gasket 24 of rubber or other suitable material. Thus air which is sucked in at the bottom of the nozzle 10b in the area below and immediately adjacent the tube 19 is swept forwardly past the underside of the tube and lower edge 23a of the partition and upwardly between the latter and the rotary brush 15. In so doing, the air is subjected to the concentrated radiation from the tube 19, and is to this extent sterilized thereby. Also, ozone which is produced in limited quantities by the tube 19 mixes with the air and acts as a purifying agent.

Particles of dust and dirt which are swept from the floor surface by the counterclockwise-rotating brush 15 are pulled upwardly in front of the partition 23 by the strong upward draft of air created by the impeller 12, and comparatively little is thrown backward under the edge 23a of the partition against the tube 19. A further deterrent preventing dirt particles from the brush 15 from being lodged within the enclosure provided by the partition 23 is the strong current of air which is continually sweeping forwardly past the lower edge 23a of said partition.

For the purpose of guarding the tube 19 from injury, a screen or frame 25 is provided to fit the mouth of the nozzle 10b, the frame having a piece of wire mesh 26 located to extend between the tube and the floor surface to prevent protruding objects over which the vacuum cleaner might pass, from striking the tube. The front edge of the frame 25 is pivotally mounted at 27 on the nozzle 10b, and the rear edge provided with a clasp in the form of resilient fingers 25a which are apertured and adapted to engage hooks 28 on the exterior of the housing wall 10c.

The frame 25 has an elongate aperture 25b through which the brush 15 may extend, and between the aperture 25b and the screen 26, a solid wall 25c is provided. The wall 25c results in a strong current of air being sucked through the screen 26 and forwardly in the confined space between the lower edge 23a of the partition and the wall 25c, thereby further insuring against dirt particles thrown from the brush 15 striking the tube 19.

The ultraviolet ray tube 19 may be any of various types. However, that shown by way of example, is somewhat like fluorescent lighting tubes in general use at the present time except that it is adapted to produce a large quantity of ultraviolet rays. The tube has pairs of terminals 29 and 30 at its opposite ends, which may be respectively connected to filamentary electrodes as shown in Fig. 3. Referring to Figs. 2 and 3, circuit elements are provided for the tube 19, comprising an automatic starter 31 connected to one of each pair of terminals 29 and 30 of the tube, and an energizing circuit comprising wires 32 and 33 connected respectively to the remaining terminals of the tube. The wire 32 is connected through an inductive ballast 34 to a wire 35, which latter together with the wire 33, are connected to the main switch 37 of the cleaner. The cleaner motor 11 is also connected by wire 38 to the switch 37.

Thus it will be seen, that according to the present invention there is a triple action in effecting sterilization and purification during operation of the vacuum cleaner. First, the floor surface or rug is subjected to germ-destroying rays. Second, the air sucked into the cleaner is subjected to the germ-destroying rays, and third, the ozone produced by the ray device further purifies the air passing into the cleaner, and the dust and dirt contained in the filter.

Also, the filter of the cleaner is not altered in any way, so that it may be removed and cleaned in the usual convenient manner, nor is there danger of breakage of the ray-emitting device during the operation.

According to the present invention an automatic electric switch means is provided for disconnecting the ultraviolet ray tube 19 when the vacuum cleaner is tilted from the floor, thereby preventing any likelihood of damage to a user from the rays. In the embodiment of the invention illustrated in Figs. 1 through 3, a gravity-controlled switch 36 is provided in the line 35, this switch comprising the usual mercury type which, when held in the position shown in Fig. 2, maintains the circuit closed. However, when the cleaner housing 10 is lifted from the floor and tilted in any direction the mercury will flow in such a manner as to break the connection and disconnect the tube 19 from the circuit, thereby rendering the tube harmless.

As shown in Fig. 2 the switch 36 may be mounted on the base plate 21 by means of a bracket 40, and the ballast inductor 34 mounted on the top of the base plate by brackets 41. The automatic starter 31 may be carried in a socket 42, and the base plate 21 apertured to permit the starter to extend downwardly through it as shown, so that it may be readily removed and replaced when necessary.

Preferably, according to the present invention, the base plate 21 is resiliently mounted by the brackets 22. As shown in Fig. 2 this is accomplished by means of rubber bushings 43 carried by the brackets and to which the base plate is secured by bolts 44.

A modified form of the invention is shown in Fig. 4. According to this form, a switch means is provided, for automatically disconnecting the ultra-violet ray tube 19, which is under the control of a spring and becomes operative immediately upon lifting the vacuum cleaner from the floor regardless of whether or not it is tilted.

Accordingly, as shown, a wheel 18a may be provided rotatably carried by a yoke 45 pivotally mounted by means of a pin 46 in the housing 10. The wheel 18a and mounting therefor may be substituted for the rear wheel 18 of the cleaner shown in Fig. 1. A pair of lugs 47 and 48 is provided on the housing 10, one above and the other below the yoke 45 to act as stops and permit the yoke to have but a limited vertical pivotal movement. For yieldably holding the yoke against the lower stop 47, in which position the wheel 18a is extended, a helical compression spring 49 is provided engaging the yoke 45 and a wall 10d of the housing 10.

Above the yoke 45 an electric switch 50, which may be of the "micro-switch" type is mounted, the switch being secured to the wall 10d of the housing in such a position that when the yoke 45 is being held against the upper stop 48 the switch will be actuated by the yoke and held in closed-circuit position. However, when the yoke 45 is moved against the stop 47 by the spring 49, the plunger 50a of the switch is permitted to extend so as to open the switch contacts. Lead wires 51 and 52 are provided for connecting the switch 50 in the circuit, the switch being inserted in place of the mercury switch 36 described above.

Thus when the vacuum cleaner is being supported by a floor surface the pressure on the wheel 18a will cause the yoke 45 to be held against the upper stop 48, thereby closing the circuit through the switch and energizing the ultra-violet ray tube 19. However, if the vacuum cleaner should be lifted from the floor surface for any reason the spring 49 will move the yoke 45 downwardly against the stop 47, thereby allowing the switch 50 to open the circuit and de-energize the tube 19 to prevent possible injury to a user from the rays of the latter.

Variations and modifications may be made within the scope of this invention and portions of the improvements may be used without others.

I claim:

1. In a vacuum cleaner, the combination of a floor-traversing nozzle having an elongate opening the edges of which are adapted to extend closely adjacent the floor surface; means for creating a suction in the nozzle; a driven rotary brush carried within the nozzle, extending along one of the side edges of the elongate opening; an elongate ultra-violet ray tube extending along the other side edge of the elongate opening, said tube being adapted to direct rays against the floor surface to sterilize same; an enclosure comprising a partition secured in the nozzle, and extending between the brush and the ultraviolet ray tube, said partition closing off the tube from the nozzle interior except along the bottom of the tube; and a screen covering the opening of the nozzle, said screen having an elongate aperture through which the brush extends, a perforate portion adjacent the ultra-violet ray tube, and a solid wall portion between the said aperture and perforate portion, the lower edge of said partition being spaced from the solid wall portion of the screen to permit passage of air through said space from the said perforate portion whereby said air will deter dirt particles thrown by the brush from entering the enclosure and striking the ultra-violet ray tube.

2. In a vacuum cleaner having a floor-traversing nozzle, the combination of a germ-inactivating ray generator comprising a filament-type gaseous discharge tube; a base on which said tube is mounted; and means for mounting the base in the nozzle in position to direct the rays from the tube against the floor surface to sterilize same, said mounting means comprising rubber blocks secured to the base and to the nozzle whereby the base and tube carried thereby are cushioned against shocks to which the nozzle may be subjected.

3. A vacuum cleaner having a suction nozzle provided with an open surface-traversing end adapted to be located closely adjacent the surface being cleaned; a germ inactivating ray generator carried within the nozzle immediately adjacent the open end to direct rays against the surface under the nozzle which is being cleaned and exposed to the air sucked through the nozzle to sterilize the surface and said air; and a protective screen interposed between the generator and the surface being cleaned and secured to extend across the nozzle to protect the generator against damage by projections on the surface being cleaned without preventing the rays from engaging the surface or the air from passing into said nozzle through said screen.

4. The invention defined in claim 3 wherein the open end of the nozzle is elongate and the generator comprises a long gaseous discharge tube extending for substantially the length of the open end.

5. The invention defined in claim 3 wherein a rotary brush is also carried in the open end of the nozzle to lift and remove dirt particles from the surface being cleaned and a baffle terminating in spaced relation to the screen is provided within the nozzle between the brush and generator to prevent dirt from the brush being thrown against said generator.

6. The invention defined in claim 3 wherein the cleaner has a dust-receiving filter bag and wherein the air passing the ray generator carries ozone produced by said generator into the bag to purify the air therein.

7. A vacuum cleaner having a suction nozzle provided with an open surface-traversing end adapted to be located closely adjacent the surface being cleaned; an electrically operated germ inactivating ray generator carried within the nozzle immediately adjacent the open end to direct rays against the surface under the nozzle which is being cleaned and exposed to the air sucked through the nozzle to sterilize the surface and said air; a control circuit for said generator, said nozzle shielding said rays from all passage except through the open end thereof; switch means in the control circuit and operative in response to movement of the cleaner which would cause unshielded emission from the ray generator to be directed away from the surface being cleaned to open said control circuit; and a protective screen interposed between the generator and the surface being cleaned and secured to extend across the nozzle to protect the generator against damage by projections on the surface being cleaned without preventing the rays from engaging the surface or the air from passing into said nozzle through said screen.

8. The invention defined in claim 7 wherein the switch means comprises a gravity operated switch actuated by the tilting of the cleaner from its operative position to open the control circuit.

9. The invention defined in claim 7 in which wheel means is provided for supporting the nozzle in position over the surface to be cleaned and in which the switch means has a surface-engaging operator mechanism including yieldable means for moving the mechanism to open-circuit position when the nozzle is lifted from the surface, said mechanism being held in closed-circuit position when the nozzle is being supported for operation on the surface, and said mechanism including a wheel of the wheel means upon which the nozzle rides when the cleaner is being used.

10. The invention defined in claim 7 in which the switch means has a surface engaging operator mechanism including yieldable means for moving the switch means to open-circuit position when the nozzle is lifted from the surface, said switch means being held in closed-circuit position when the nozzle is in position for operation on the surface.

JEFFERSON P. BUCKEY.

REFERENCES CITED

The following references are of record in the file of this patent:

UNITED STATES PATENTS

| Number | Name | Date |
| --- | --- | --- |
| 759,141 | Thurman | May 3, 1904 |
| 1,244,917 | Tanaka | Oct. 30, 1917 |
| 1,297,525 | Wood | Mar. 18, 1919 |
| 1,527,224 | Riordan | Feb. 24, 1925 |
| 1,573,771 | McClatchie | Feb. 16, 1926 |
| 1,597,855 | Zahorsky | Aug. 31, 1926 |
| 1,773,381 | Tandberg | Aug. 19, 1930 |
| 1,996,934 | Siedle | Apr. 9, 1935 |
| 2,014,185 | Martin | Sept. 10, 1935 |
| 2,046,096 | Sperti | June 30, 1936 |
| 2,176,769 | Martinet | Oct. 17, 1939 |
| 2,215,123 | Kalischer | Sept. 17, 1940 |
| 2,242,163 | Bargeboer | May 13, 1941 |
| 2,274,971 | White | Mar. 3, 1942 |
| 2,293,618 | Nelligan | Aug. 18, 1942 |
| 2,295,824 | Batsel | Sept. 15, 1942 |
| 2,297,933 | Yonkers | Oct. 6, 1942 |
| 2,309,546 | Shapiro | Jan. 26, 1943 |
| 2,310,768 | Eckhardt | Feb. 9, 1943 |
| 2,316,540 | Danley | Apr. 13, 1943 |
| 2,335,056 | Grison | Nov. 23, 1943 |
| 2,383,421 | Schultz | Aug. 21, 1945 |
| 2,397,757 | Schwedersky | Apr. 2, 1946 |